United States Patent
Huber et al.

(10) Patent No.: US 10,537,007 B2
(45) Date of Patent: Jan. 14, 2020

(54) ILLUMINATION DEVICE WITH DIAGNOSTICS

(71) Applicant: B&R INDUSTRIAL AUTOMATION GMBH, Eggelsberg (AT)

(72) Inventors: Matthias Huber, Pleiskirchen (DE); Andreas Waldl, Eggelsberg (AT); Franz Kaufleitner, Hochburg-Ach (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/227,897

(22) Filed: Dec. 20, 2018

(65) Prior Publication Data
US 2019/0200425 A1 Jun. 27, 2019

(30) Foreign Application Priority Data
Dec. 21, 2017 (EP) .................................... 17209792

(51) Int. Cl.
*H04N 5/222* (2006.01)
*H05B 33/08* (2006.01)
*H04N 5/225* (2006.01)
*H04N 5/235* (2006.01)

(52) U.S. Cl.
CPC ......... *H05B 33/089* (2013.01); *H04N 5/2256* (2013.01); *G06T 2207/10152* (2013.01); *H04N 5/235* (2013.01)

(58) Field of Classification Search
CPC .................. H04N 5/235; H04N 5/2256; G06T 2207/10152
USPC .................................................. 348/370, 372
See application file for complete search history.

(56) References Cited

U.S. PATENT DOCUMENTS

| | | | | |
|---|---|---|---|---|
| 5,416,335 A | * | 5/1995 | Forehand | G01N 21/8851 250/229 |
| 10,136,491 B2 | * | 11/2018 | Huber | H05B 37/02 |
| 2002/0153422 A1 | * | 10/2002 | Tsikos | G06K 7/10742 235/454 |

(Continued)

FOREIGN PATENT DOCUMENTS

| WO | 2009/146201 | 12/2009 |
|---|---|---|
| WO | 2015/097476 | 7/2015 |

OTHER PUBLICATIONS

Europe Office Action conducted in counterpart Europe Appln. No. 17 20 9792 (dated Jun. 19, 2018).

*Primary Examiner* — Thuy V Tran
(74) *Attorney, Agent, or Firm* — Greenblum & Bernstein, P.L.C.

(57) ABSTRACT

To provide an illuminator, which offers reliable protection against undesirably high levels of emitted light intensity, there is provided on the illuminator according to the invention, in addition to a light source and a control unit, which supplies the light source with an electric current or an electric voltage and is equipped to regulate the intensity of an emitted light via the electric current or the electric voltage, a detector, which captures at least a performance variable of the light source. In addition, a diagnostic unit is provided, which compares the at least one performance variable against at least one specified limit value and triggers an action, which reduces the intensity independently of the control unit, as soon as the at least one performance variable reaches or exceeds the at least one limit value.

17 Claims, 3 Drawing Sheets

(56) References Cited

U.S. PATENT DOCUMENTS

2009/0284176 A1  11/2009  Blenis, Jr.
2011/0157353 A1* 6/2011   Takayama .............. H04N 7/183
                                                         348/135
2016/0338171 A1  11/2016  Bhagat et al.
2017/0205291 A1* 7/2017   Shimada ................... G01J 9/00

* cited by examiner

ILLUMINATION DEVICE WITH DIAGNOSTICS

CROSS-REFERENCE TO RELATED APPLICATION

This application claims the priority under 35 U.S.C. § 119(a) of European Application No. 17209792.5 filed Dec. 21, 2017, the disclosure of which is expressly incorporated by reference herein in its entirety.

BACKGROUND OF THE INVENTION

1. Field of the Invention

The present invention relates to an illumination method in a machine vision application, wherein a light source, preferably a light-emitting diode, of an illumination means (or illumination device or illuminator) emits light and wherein the intensity of the emitted light is controlled by an electric current or electric voltage delivered by a control unit (or control device or controller). Furthermore, the present invention relates to an illumination means for illumination in a machine vision application having at least one light source, preferably at least one light-emitting diode that emits light, and a control unit that supplies the light source with electric current and/or electric voltage and is equipped to control the intensity of the emitted light via the electric current and/or electric voltage, and a machine vision system with a work station, whose illuminated area is captured by a camera and is illuminated by at least one illumination means according to the invention.

2. Discussion of Background Information

Modern illumination means, specifically for use in industrial image processing (machine vision systems) are produced for the most part out of semiconductors, e.g., with LEDs, diode lasers or also using OLED technology. As is known, machine vision pertains to methods for controlling or regulating technical processes, for example machines or systems, wherein the information required for controlling or regulating is obtained at least partly by using automated image processing of an image recorded of an object (a workpiece for example) using a camera. Therefore, a machine vision system comprises a camera, illumination means with a light source for illuminating at least the recorded region, and an evaluation unit for evaluating the image, wherein image refers to both one or more individual photograph(s), as well as a sequence of photographs, in other words a film. Often, the camera and the evaluation unit are installed in one device to form a so-called smart camera. To adjust the intensity of the emitted light, or the light density of the illumination means, various methods are used, such as regulating a constant voltage source, PWM (pulse width modulation) mode, and so on.

When designing an illumination means, particularly for machine vision applications, photobiological safety is to be taken into account. Photobiological safety pertains to all light sources found in an illumination means or to individual light sources, depending on the risk/spectral range. Standard EN 62471:2009-03 describes the respective limits for various risk groups (RG0, RG1, RG2, RG3) in regard to photobiological safety. The risk group allocated to an illumination means may depend on the operating mode of the illumination means, e.g., the adjusted intensity, whether the illumination means is operated continuously or in flash bulb mode, and so on. Depending on the risk group, suitable measures are to be taken to protect individuals located in the vicinity of the illumination means against eye damage. This protection must occur by means of a suitable distance, eye-protection measures, or shielding the light source. For risk group 0 for example, no additional measures are to be taken, e.g., due to a very low intensity value of the emitted light. As a result of an operating error or a component defect of the illumination means, a light source, which is classified in one risk group, may erroneously radiate a higher light intensity, for example in a certain spectrum, than would actually be permissible given the risk group. Thus, in such a case, the photobiological safety of individuals in the vicinity of the illumination means is naturally no longer sufficiently assured. Obviously, it would be desirable to prevent this.

SUMMARY

Therefore, embodiments of the present invention provide an illumination means (or illumination device or illuminator) that offers reliable protection against an undesirably high level of emitted light intensity.

According to embodiments the invention, a method is described, in which independent of the control unit (or control device or controller), a performance variable of the light source is recorded and compared against at least one limit value. As soon as the at least one performance variable reaches or exceeds the at least one limit value, an action is triggered with which the intensity is reduced, independently of the control unit.

In embodiments, an illumination means, in which a detection unit (or detector) is provided, captures at least one performance variable of the light source, and a diagnostic unit (or diagnose) is provided, which compares the at least one performance variable against at least one specified limit value, and triggers an action as soon as the at least one performance variable reaches or exceeds the at least one limit value. The detection unit may be an integral component of the diagnostic unit. The specified limit value may be provided to the diagnostic unit by a parameter unit.

The illumination means according to the invention already meets at least safety integrity level (SIL) 1 according to standard IEC 61508:2010. This standard describes structural and quality assurance measures for developing electronic and programmable electronic systems, with which one can use these systems in functionally safe applications. By suitably selecting the components or add-ons, for example in the form of necessary redundancies, the illumination means can naturally also meet a higher safety integrity level.

Controlling the intensity of the light emitted by the illumination means is controlled by an electric current and/or electric voltage delivered by a control unit to the illumination means. By determining a performance variable of the illumination means, one can draw conclusions regarding the faulty behavior of individual light sources. If the diagnostic unit detects that a performance variable reaches or exceeds a limit value, the intensity can be reduced by a triggered action. The limit value may be reached for example due to a malfunction or operating error of the control unit. Therefore, according to the invention the intensity can be reduced in the event of a malfunction or operating error of the control unit independently of the control unit, wherein it is important that one does not only intervene in the regulating mechanisms of the control unit itself. For that reason, the intensity is reduced via an independent shut-off path, which acts upstream or downstream of the control unit for example.

The current or electric voltage to the illumination means can be reduced and/or interrupted as action by the diagnostic unit.

If the electric current or electric voltage is interrupted or reduced, the intensity of the emitted light is reduced (reduced to zero in the event of an interruption), without turning to the regulating mechanisms of the control unit itself. Instead, the action acts on the electric current or electric voltage provided to the light source after to the control unit, wherein switches, or other regulating or dimming mechanisms, consisting for example of MOSFET, transistors, relays, and so on, can be used to reduce or interrupt the electric current or electric voltage.

A supply current of the control unit and/or the light source can be interrupted as action by the diagnostic unit. If the supply current (of the control unit and/or the illumination means), is interrupted, for example by means of a switch, then the illumination means is deactivated, whereby no light is emitted. The intensity of the emitted light is thus reduced to zero—without resorting to regulating mechanisms of the control unit itself. Instead, the action already acts on its supply current before the control unit, or independently of the control unit on the direct supply current of the illumination means.

Advantageously, the at least one performance variable correlates with the intensity and preferably represents the intensity itself, for example in a certain spectral range. The electric current or electric voltage can also be used as at least one performance variable. Other variables, including variable parameters such as temperatures of the illumination means or the surroundings, emitted spectra, relationships in the trends of temperature and brightness, current and brightness, current and voltage, etc. can also be utilized. Basically, one can record not only instantaneous values, but also for example derived relative values or temporal profiles as performance variables and compare these against limit values, which for example also represent temporal profiles.

It is particularly advantageous when the illumination means in the intended operating mode meets the requirements of a risk group according to EN 62471:2009-03 and the limit value serves as requirement of a risk group, preferably of the risk group when in the intended operating mode. In this way, exceeding limit values, which would result in an increase of the risk group, can be prevented independently by the control unit. Naturally, exceeding the risk group anticipated for the intended operating mode can be permitted, for example by an additional risk group. In this way, the desired maximum risk group can be limited depending on the application, location of use (i.e., anywhere or only accessible to trained personnel or fully shielded, etc.) and the properties of the illumination means (spectral range, maximum power output, radiation characteristics, etc.).

Machine vision systems having a work station, whose illuminated area is captured by a camera, can be illuminated by at least one illumination means according to the invention. Applications in industrial lighting using integrated intelligence (smart lights) are also possible.

BRIEF DESCRIPTION OF THE DRAWINGS

The present invention is explained in greater detail below with reference to FIGS. 1 to 4, which depict in a schematic, illustrative and non-restrictive manner advantageous embodiments of the invention. Depicted are.

DETAILED DESCRIPTION

Figure 1:
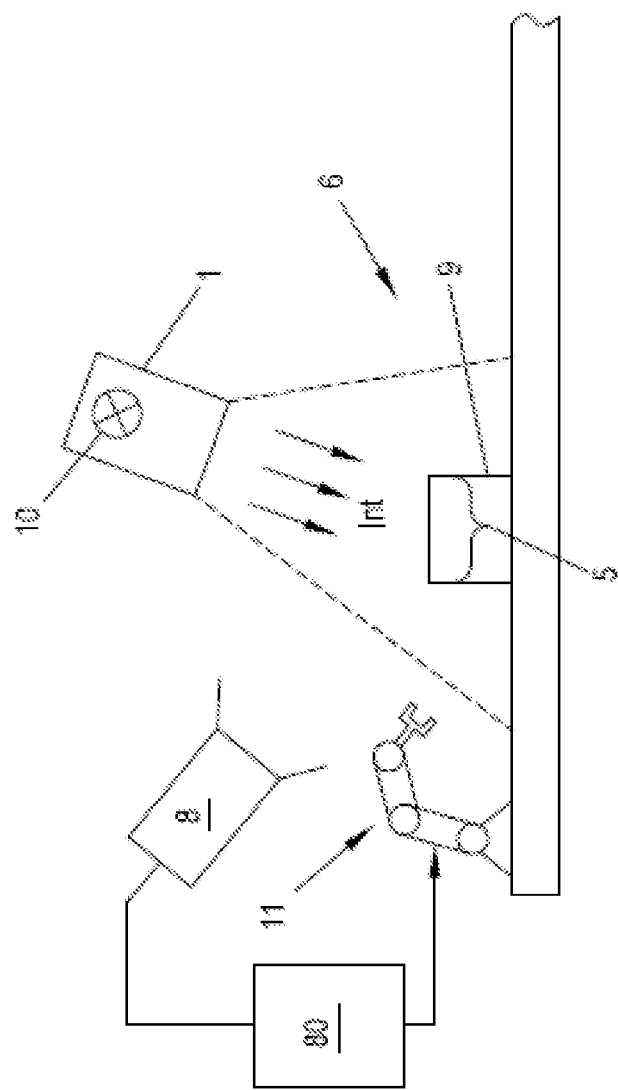
FIG. 1 a typical machine vision arrangement.

FIG. 1 depicts a typical arrangement of a machine vision application. Illumination means (or illumination device or illuminator) 1 having a light source 10, for example an LED or an arrangement of LEDs, illuminates an illuminated area 5 at a work station 6, e.g., a processing or machining machine. In the illuminated area 5 of the illumination means 1, there is a component 9, which is illuminated by the illumination means 1 by light L having intensity Int, and which is recorded by a camera 8, which captures the illuminated area 5 (or a portion of it). The image recorded by camera 8 is evaluated by an evaluation unit 80 and the information derived from it is used to control or regulate work station 6 and/or a processing unit 11 in work station 6. The evaluation unit 80 can thereby also be part of a camera 8. Obviously, illumination means 1 can also be an integral component of the camera 8 and/or an evaluation unit 10. Since the setup of a machine vision application is sufficiently known, further details of such machine vision applications and systems will not be addressed here.

Figure 2:
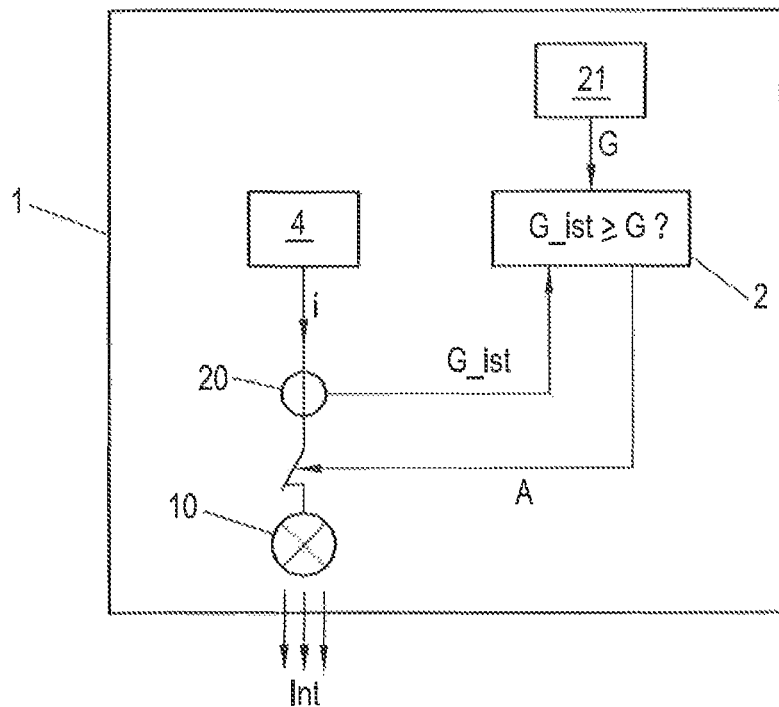
FIG. 2 a first embodiment of the illumination means.

FIG. 2 depicts a first embodiment of illumination means 1, wherein a light source 10 is provided. Of course, there may be multiple light sources 10 in an illumination means 1. According to the invention, a diagnostic unit (or diagnoser) 2, for example a microprocessor, a storage-programmable control unit, an integrated circuit (FPGA, ASIC), or similar, and a detection unit (or detector) 20 are provided. The detection unit 20 records an actual performance variable G_ist of light source 10 or illumination means 1. The performance variable G_ist may correlate to the intensity Int and for example represent the intensity itself, whereby the detection unit 20 may represent an intensity sensor. In the design according to FIG. 2, the detection unit 20 represents a current sensor, which detects an electric current i supplied by control unit (or control device or controller) 4 to light source 10, said current I also correlating with the intensity Int as is known. Of course, an electric voltage provided to light source 10 by the control unit 4 could also be detected. Both detection unit 20 as well as the diagnostic unit 2 are provided in FIG. 2 as integral components of the illumination means 1, but can naturally also be provided as separate components outside of the illumination means 1.

Diagnostic unit 2 thus compares the performance variable G_ist against a limit value G. The limit value G can be transmitted to the illumination means 10 as represented in FIG. 2 by a parameter unit 21 (for example via a data bus) or also be known to diagnostic unit 2 beforehand, and be stored in a memory, for example. The actual performance variable G_ist—in this case current i delivered to illumination means 10—is provided to diagnostic unit 2 by detection unit 20.

If an excessively high current i is specified for example due to an incorrect setting or a fault at the control unit 4 of the illumination means 10, this could result in exceeding the limit value of a desired risk group RG if the method according to the invention is not in place, as a result of which the illumination means would fall into a higher risk group RG, which represents a hazard to humans and animals for example due to an excessively high level of emitted intensity Int.

The performance variable G_ist provided by the detection unit 20 is compared to the limit value G by the diagnostic unit 2. As indicated in FIG. 2, the limit value G can be provided to the diagnostic unit 2 by a parameter unit 21. If the performance variable G_ist reaches or exceeds the limit value G, preferably by more than a specified tolerance (which may also be stored in the parameter unit 21 for example), then at least one action A is triggered. To this end and action A, the light source 10 or the illumination means 1 can be deactivated, for example by the electric current i delivered to light source 10 and/or an electric voltage applied to light source 10, being reduced. In this way, the intensity Int of the emitted light is reduced for example. As action, not only could the entire emitted intensity be reduced, but also only a spectral portion, to the extent this is possible by interfering with electric current i delivered and/or electric voltage applied to the light source 10. It is thereby important that the action does not result in any interference in control unit 2 or its regulating mechanisms.

Also the electric current i delivered to the light source 10 and/or an electric voltage applied to the light source 10 can be interrupted entirely. In this way, the intensity Int of the emitted light is reduced to zero, in other words shut off. Therefore, according to the illumination means 1 can be brought to a safe mode by diagnostic unit 2 without interfering with control unit 4 according to the invention, wherein additionally an optical, acoustic or similar warning signal can be emitted, to which machine- or plant-operating personnel can respond.

Figure 3:
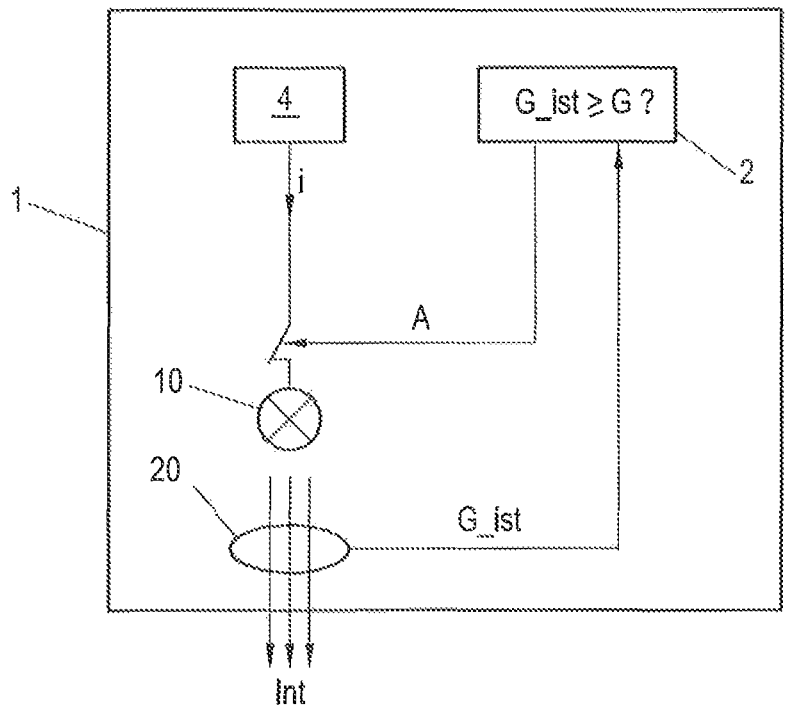
FIG. 3 a second embodiment of the illumination means.

Of course, another performance variable G_ist, advantageously correlating with the intensity Int, can be measured by the detection unit 2 and transmitted to the diagnostic unit 2. For example in a second advantageous design according to FIG. 3, intensity Int is determined as performance variable G_ist, by the detection unit 20, for example an intensity sensor, and transmitted to the diagnostic unit 2. According to the invention, the diagnostic unit 2 compares performance the variable G_ist to the limit value G and triggers an action A, with which the intensity Int is reduced independently of the control unit 4 as soon as the at least one performance variable G_ist reaches or exceeds the at least one limit value G. In the situation depicted in FIG. 3, the current i is reduced or interrupted as action A by diagnostic unit. Of course, another action independently from the control unit 4 is also conceivable to reduce the intensity Int, for example by interrupting a supply current iq, as is described further below, by means of the embodiment according to FIG. 4. For example, the entire intensity Int of the emitted light as well as the intensity Int of a certain spectral range can be considered as performance variable G_ist. As is known, at a certain intensity Int blue light for example poses a higher risk than red light at the same intensity Int.

Of course, the detection unit 20 can also measure other variables and these can be converted into the performance variable G_ist to be transferred, whereupon the performance variable G_ist is transmitted to the diagnostic unit 2, or the other performance variable is transmitted by the detection unit 20 to the diagnostic unit 2, and is first converted in it into the performance variable G_ist, before it is compared to the limit value G.

Figure 4:
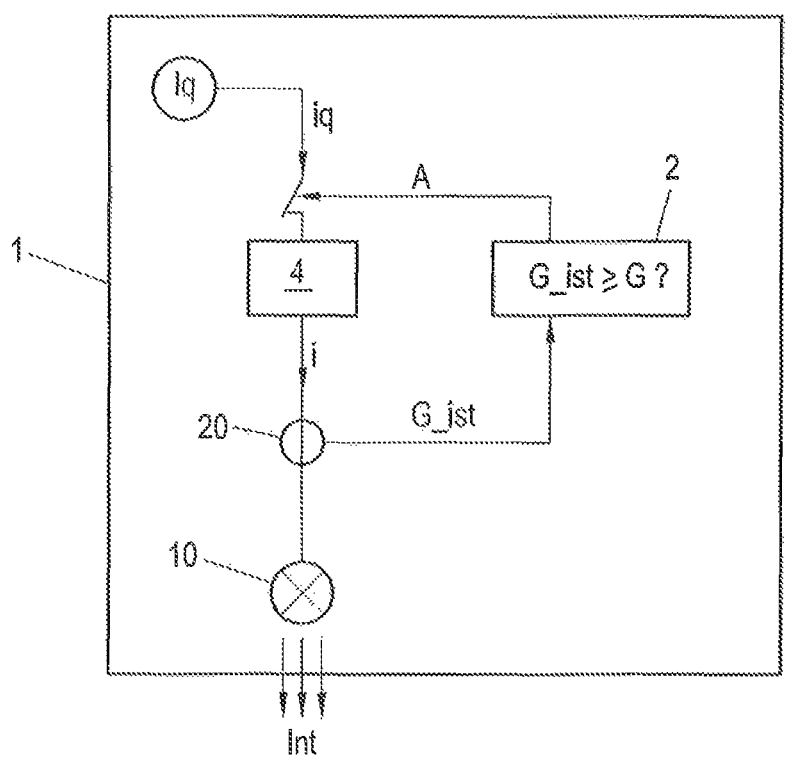
FIG. 4 a third embodiment of the illumination means.

In a second advantageous embodiment according to FIG. 4, as action, not the electric current i delivered by control unit 4 to illumination means 10 (or the delivered electric voltage) is interrupted or reduced, but a supply current iq delivered to control unit 4 by a current supply Iq is interrupted instead, whereby the intensity Int of the light emitted by illumination means 1 can be reduced (to zero). In the embodiment according to FIG. 4, the electric current i is detected by the detection unit 20 as at least one performance variable G_ist and transmitted to the diagnostic unit 2. Naturally in this embodiment, the detection unit 20 could also determine a different performance variable G_ist, for example the intensity Int, etc. The diagnostic unit 2 compares the at least one performance variable G_ist to at least one specified limit value G (which can be provided for example by a parameter unit 21) and triggers an interruption of the supply current Iq as action as soon as the at least one performance variable G_ist reaches or exceeds at least one limit value G. In this way, the intensity Int is reduced (to zero) independently of the control unit 4. The interruption of the supply current Iq may be particularly advantageous if the control unit 4 is integrated to the light source 10, and interference with the delivered electric current i or the delivered electric voltage is not possible in an easy way.

If the light source 10 itself has, independent of the control unit, 4 a current supply Iq, which supplies the light source 10 with a supply current iq, then this supply current iq can be interrupted as action.

In other words, as action A, the light source 10 can be shut off by shutting off the electric current i and/or the electric voltage and/or shutting off a supply current iq, without intervening in the regulation of the control unit 4. As mentioned, the intensity Int can also be limited as an action A, by the electric current i and/or the electric voltage u being reduced.

Preferably an illumination means 1 according to the invention meets the requirements of a risk group RG according to EN 62471:2009-03 when in intended operating mode. A requirement of a risk group RG can preferably be used as limit G in the intended operating mode. Therefore, as action A, the intensity Int as a whole or where applicable the intensity Int of a certain spectral range can be limited in such a manner that the performance variable G_ist does not exceed the limit value G, whereby the risk group RG of illumination means 1 is not raised. The method according to the invention can consider an excessively long illumination period as a function of the spectral range etc. as performance variables, and respond with an action A if the corresponding limit values G are reached or exceeded.

The invention claimed is:

1. An illumination method in a machine vision system having an illuminator comprising at least one light source emitting light with an intensity and a control device configured to regulate the intensity of the emitted light by supplying and adjusting at least one of an electric current or electric voltage to the illuminator, the method comprising:
   capturing at least one performance variable that correlates to the intensity of the emitted light of the at least one light source;
   comparing the captured at least one performance variable to at least one limit value; and
   independently of the control device, triggering an action when the at least one performance variable reaches or exceeds the at least one limit value to reduce the intensity of the at least one light source,
   wherein the at least one performance variable comprises at least one of intensity of the at least one light source, the electric current supplied to the at least one light or the electric voltage supplied to the at least one light.

2. The illumination method according to claim 1, wherein an intended operating mode of the illuminator meets requirements of a risk group pursuant to photobiological safety, and
   wherein the at least one limit value is selected based on the risk group for in the intended operating mode of the illuminator.

3. The illumination method according to claim 1, wherein the triggered action comprises reducing at least one of the current or the electric voltage to the illuminator.

4. The illumination method according to claim 1, wherein the triggered action comprises interrupting at least one of the current or the electric voltage to the illuminator.

5. The illumination method according to claim 1, wherein the triggered action comprises interrupting a supply current of at least one of the control device or the at least one light source.

6. The illumination method according to claim 1, wherein the at least one light source comprises at least one light emitting diode.

7. An illumination device for illumination in a machine vision system, comprising:
- at least one light source emitting light
- a control device configured to supply at least one of electric current or electric voltage to the at least one light source, and to regulate an intensity of the emitted light by the at least one light source by adjusting the at least one of the electric current or the electric voltage supplied to the at least one light source;
- a detector configured to capture at least one performance variable that correlates to the intensity of the emitted light of the at least one light source; and
- a diagnoser configured to compare the at least one performance variable to at least one limit value and to trigger, independently of the control device, an action reducing the intensity of the emitted light when the at least one performance variable reaches or exceeds the at least one limit value,
- wherein the at least one performance variable comprises at least one of intensity of the at least one light source, the electric current supplied to the at least one light or the electric voltage supplied to the at least one light.

8. The illumination device according to claim 7, further comprising a parameter unit connected to the diagnoser,
- wherein the diagnoser receives the at least one specified limit from a parameter unit.

9. A machine vision system comprising:
- a camera;
- at least one illumination device according to claim 7; and
- a work station having an area illuminated by the at least one illumination device that is captured by the camera.

10. The illumination device according to claim 7, wherein the detector comprises at least one of an intensity sensor, a current sensor or a voltage detector.

11. The illumination device according to claim 7, wherein the diagnoser comprises at least one of a microprocessor, a storage programmable control unit, a field programmable gate array or application specific integrated circuit.

12. The illumination device according to claim 7, wherein the at least one light source comprises at least one light emitting diode.

13. An illumination device for illumination in a machine vision system, comprising:
- at least one light source emitting light with an intensity regulatable by adjusting at least one of a current or a voltage supplied to the at least one light source;
- a detector configured to capture at least one performance variable of the at least one light source,
- wherein the at least one performance variable is compared to at least one limit value and, independently of the adjusting of the at least one of the current or the voltage supplied to the at least one light source to regulate the intensity of the emitted light, an action reducing the intensity of the emitted light is triggered when the at least one performance variable reaches or exceeds the at least one limit value, and
- wherein the at least one performance variable comprises at least one of intensity of the at least one light source, the electric current supplied to the at least one light or the electric voltage supplied to the at least one light.

14. The illumination device according to claim 13, wherein the detector comprises at least one of an intensity sensor, a current sensor or a voltage detector.

15. The illumination device according to claim 13, wherein a diagnoser is configured to compare the at least one performance variable to at least one limit value and to trigger, independently of the adjusting of the at least one of the current or the voltage supplied to the at least one light source to regulate the intensity of the emitted light, an action reducing the intensity of the emitted light when the at least one performance variable reaches or exceeds the at least one limit value.

16. The illumination device according to claim 15, wherein the diagnoser comprises at least one of a microprocessor, a storage programmable control unit, a field programmable gate array or application specific integrated circuit.

17. The illumination device according to claim 13, wherein the at least one light source comprises at least one light emitting diode.

\* \* \* \* \*